United States Patent
Birker et al.

(10) Patent No.: US 12,416,356 B2
(45) Date of Patent: Sep. 16, 2025

(54) EPICYCLIC GEAR TRAIN

(71) Applicant: Illinois Tool Works Inc., Glenview, IL (US)

(72) Inventors: Arnaud Birker, Dietwiller (FR); Lionel Martin, Sallanches (FR); Xavier Bibollet, Bonneville (FR)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/903,524

(22) Filed: Oct. 1, 2024

(65) Prior Publication Data
US 2025/0109788 A1    Apr. 3, 2025

(30) Foreign Application Priority Data

Oct. 2, 2023 (FR) ................................. 2310522

(51) Int. Cl.
*F16H 57/08* (2006.01)
*F16H 1/46* (2006.01)

(52) U.S. Cl.
CPC .............. *F16H 57/08* (2013.01); *F16H 1/46* (2013.01)

(58) Field of Classification Search
CPC ... F16H 57/08; F16H 1/46; F16H 1/30; F16H 1/32
See application file for complete search history.

(56) References Cited

U.S. PATENT DOCUMENTS

| | | | |
|---|---|---|---|
| 5,334,112 A * | 8/1994 | Nogle | F16H 45/02 475/59 |
| 11,054,001 B1 * | 7/2021 | Tamai | F16H 1/2827 |
| 2003/0104895 A1 * | 6/2003 | Yasuda | F16H 57/08 475/269 |
| 2015/0204438 A1 * | 7/2015 | Ohnuki | F16H 57/10 475/302 |
| 2018/0017153 A1 * | 1/2018 | Speller, Jr. | F16H 57/082 |
| 2022/0136586 A1 * | 5/2022 | Spruce | F16H 57/08 475/340 |

FOREIGN PATENT DOCUMENTS

| | | |
|---|---|---|
| EP | 2118518 A1 | 11/2009 |
| EP | 3470616 A1 | 4/2019 |
| FR | 2310522 A1 | 12/1976 |
| FR | 3134158 A1 | 10/2023 |

OTHER PUBLICATIONS

"Helical Gears," Science Direct, Retrieved Oct. 1, 2024. from https://www.sciencedirect.com/topics/engineering/helical-gears (10 pages).

* cited by examiner

*Primary Examiner* — Edwin A Young
(74) *Attorney, Agent, or Firm* — McAndrews, Held & Malloy, Ltd.

(57) ABSTRACT

A self-locking epicyclic gear train that includes a pinion with at least one helical gear tooth, a ring gear with a plurality of helical gear teeth and a plurality of planet gears between the pinion and the ring gear. Each planet gear comprises a plurality of helical gear teeth that engage the teeth of the ring gear and of the pinion. The helical gear teeth have a helix angle of less than 20° and the pinion is always in contact with at least one tooth of each planet gear.

14 Claims, 8 Drawing Sheets

EPICYCLIC GEAR TRAIN

RELATED APPLICATIONS

The present application claims the benefit of French Patent Application No. FR 2310522, filed Oct. 2-2023, titled "Epicycloidal Gear Train," the contents of which are hereby incorporated by reference.

BACKGROUND

This disclosure pertains to the field of epicyclic gear trains. More specifically, it relates to a drive assembly that includes a motor connected to the pinion of an epicyclic gear train, as well as a tubular motor incorporating this assembly.

Tubular motor assemblies, where motors are coupled to the pinions of epicyclic gear trains, are commonly utilized in various applications, such as motorized systems with windable components.

These tubular motor assemblies are particularly prevalent in motorized roller shutter systems. One such example is described in European Patent EP3470616B1, which details a setup where a tubular motor assembly is powered by a brushless motor driving an epicyclic gear train.

SUMMARY

The present disclosure relates generally to an epicyclic gear train, substantially as illustrated by and described in connection with at least one of the figures, as set forth more completely in the claims.

THE DRAWINGS

The foregoing and other objects, features, and advantages of the devices, systems, and methods described herein will be apparent from the following description of examples thereof, as illustrated in the accompanying figures, where like or similar reference numbers refer to like or similar structures. The figures are not necessarily to scale, emphasis instead being placed upon illustrating the principles of the devices, systems, and methods described herein.

Figure 1:
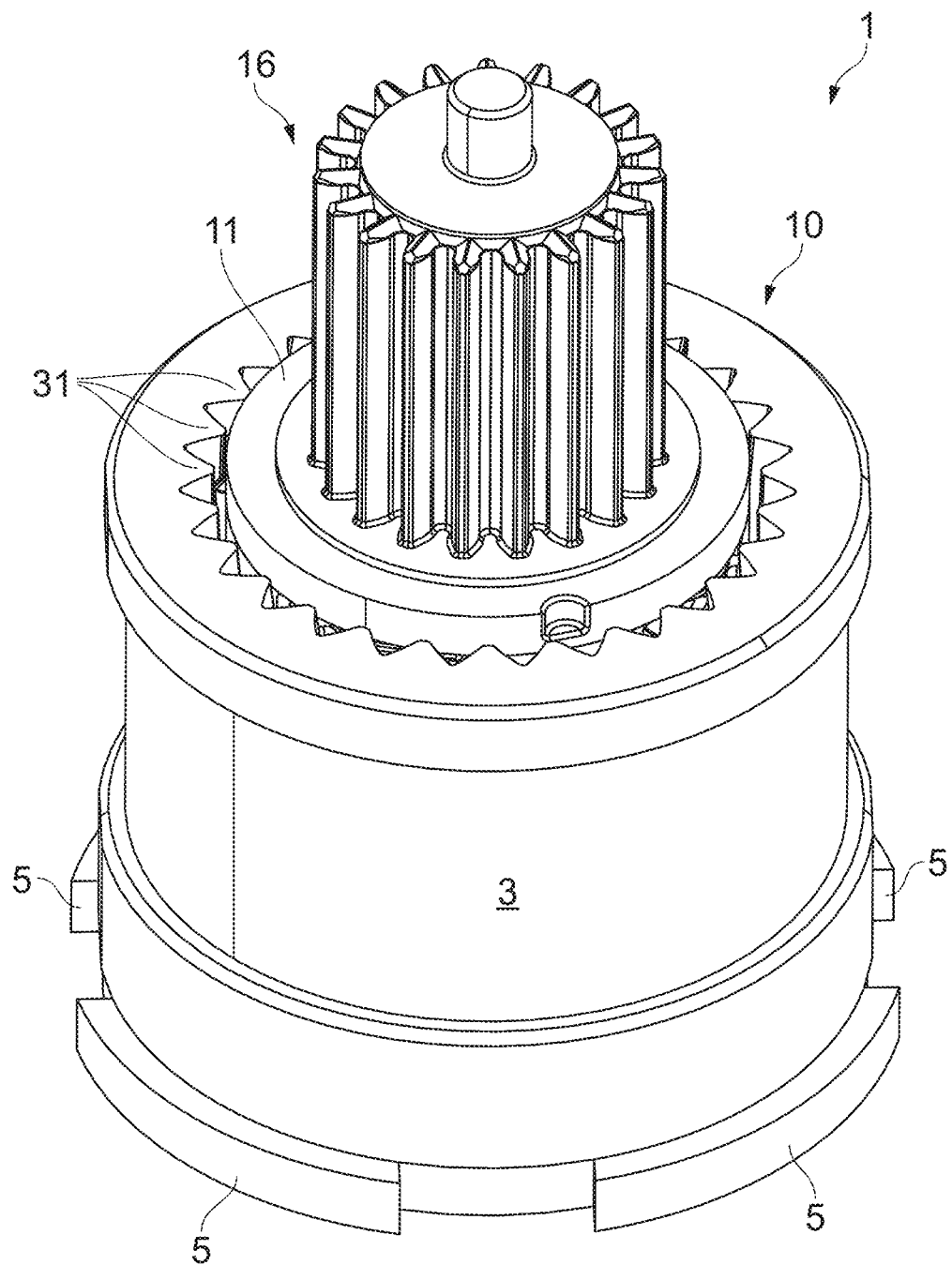
Figure 2:
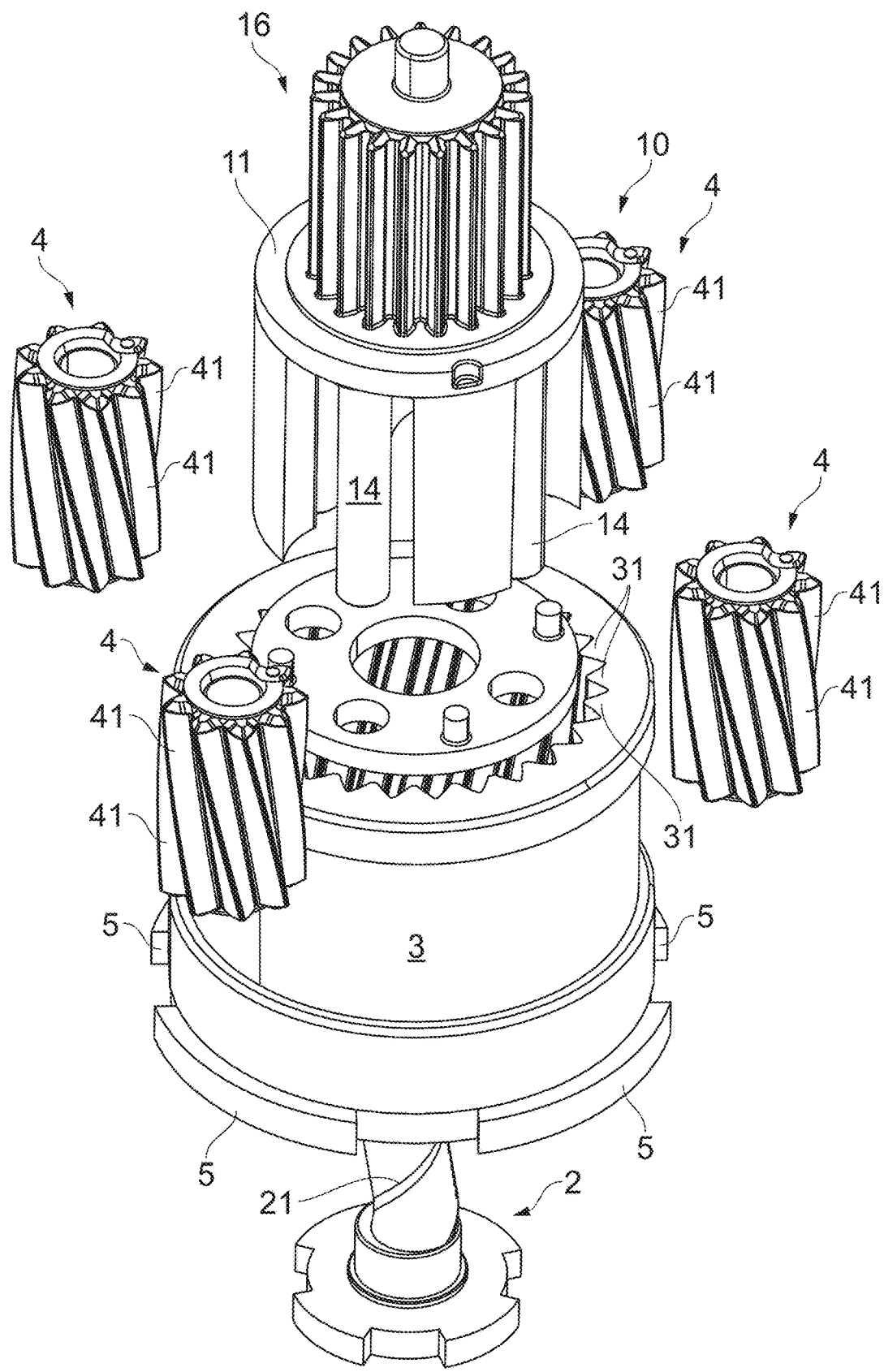
Figure 3:
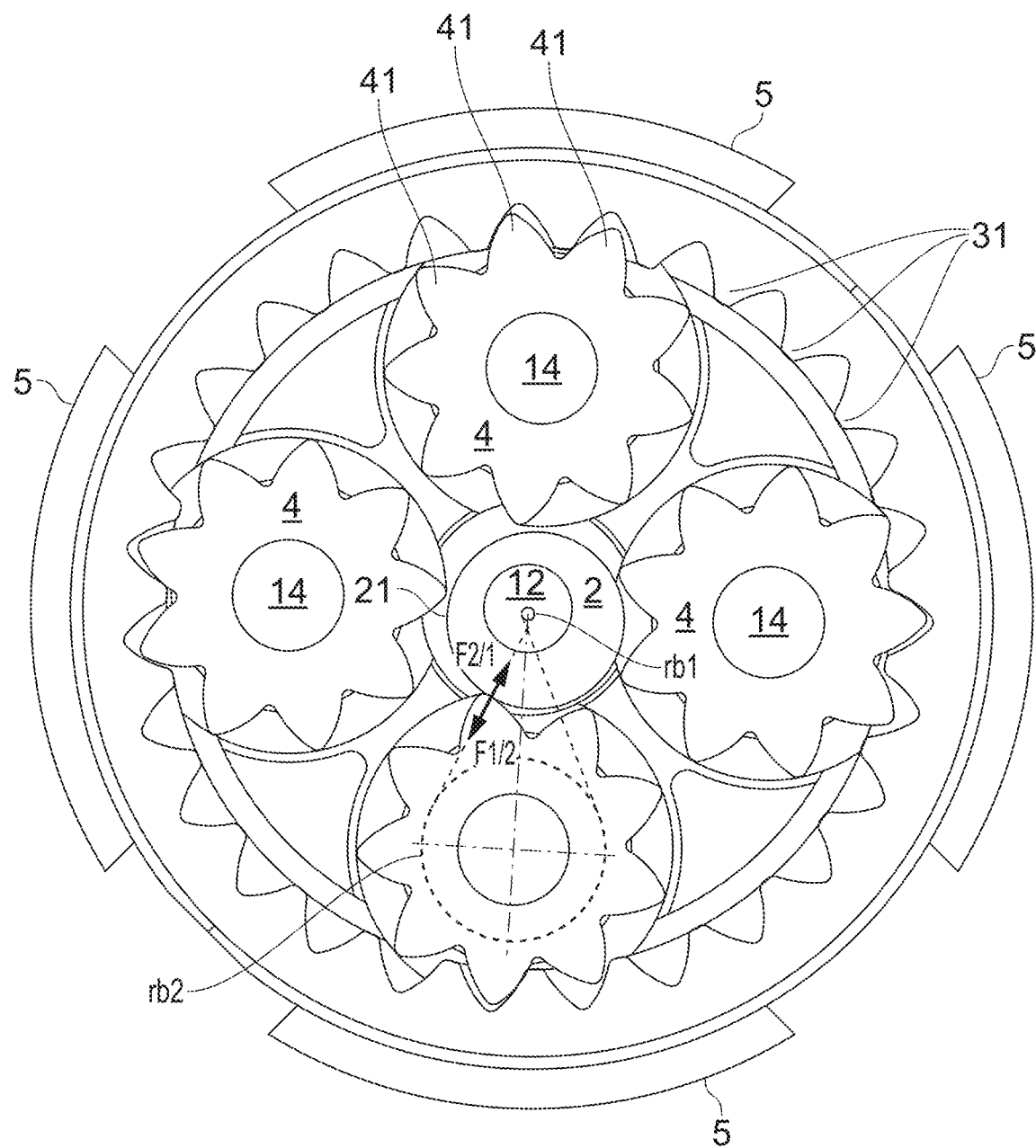
Figure 4:
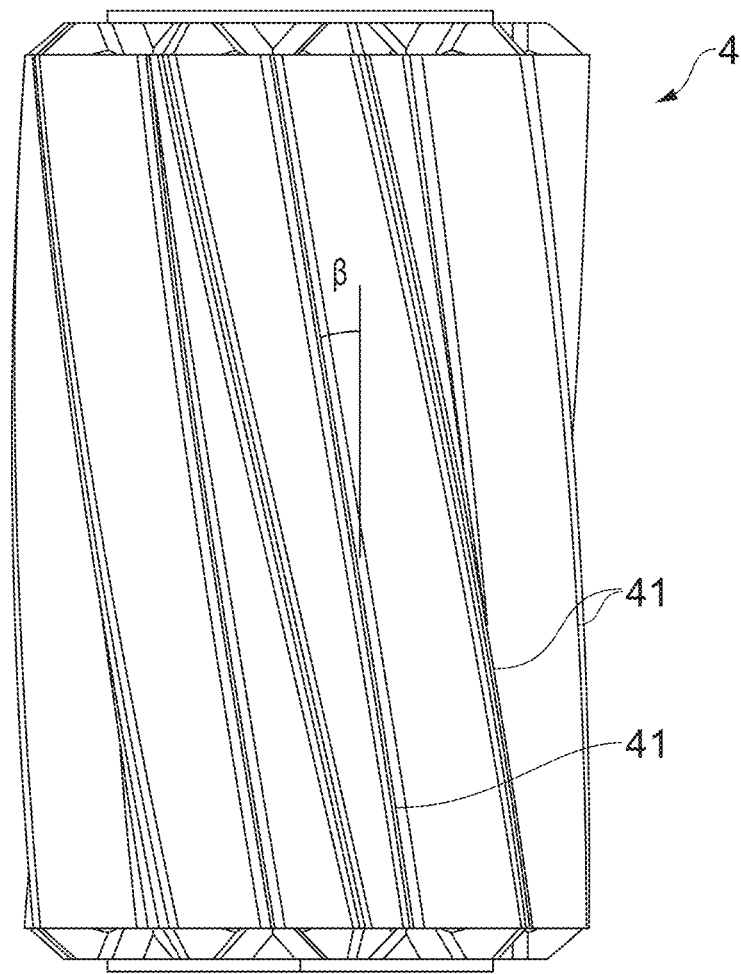
Figure 5:
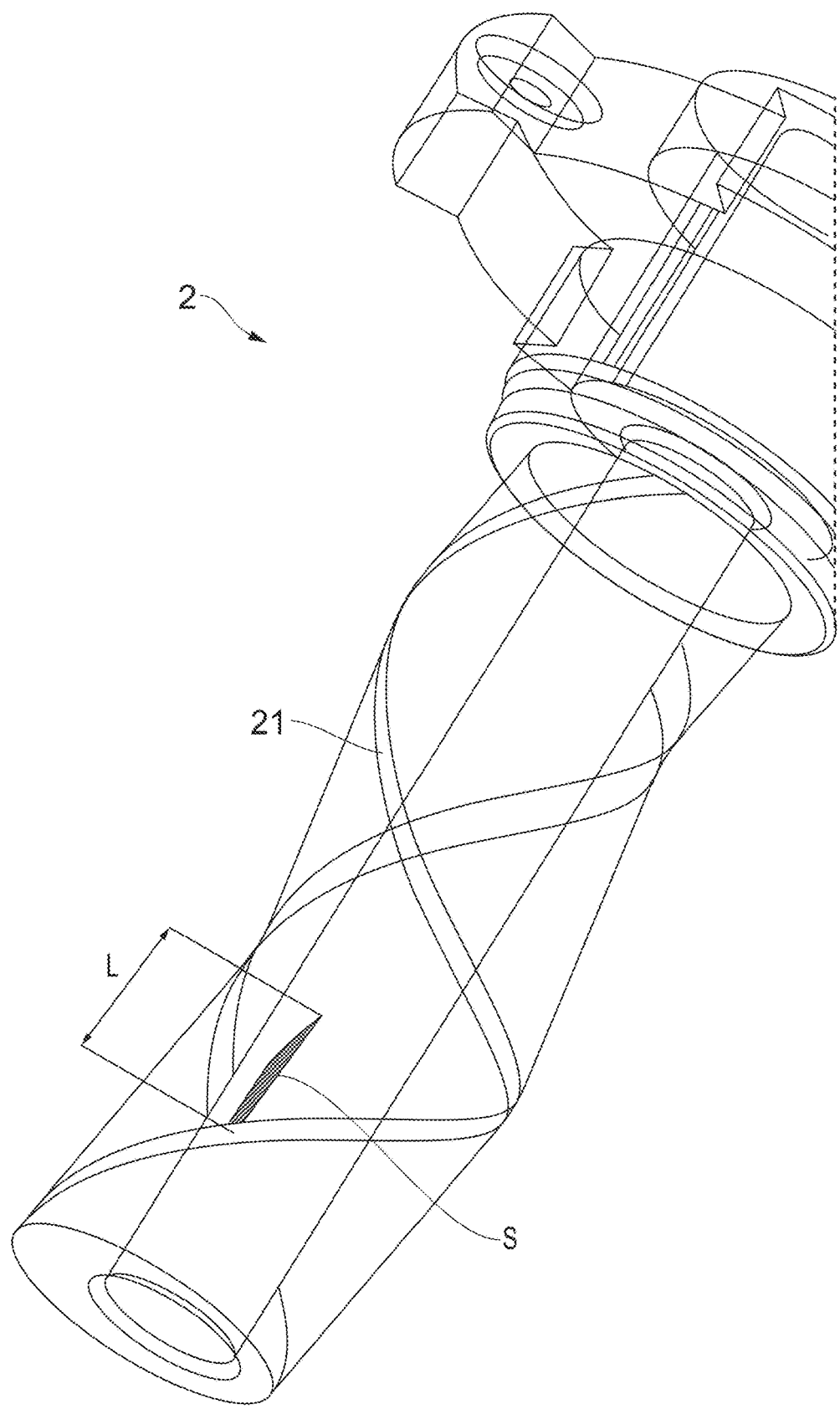
Figure 6:
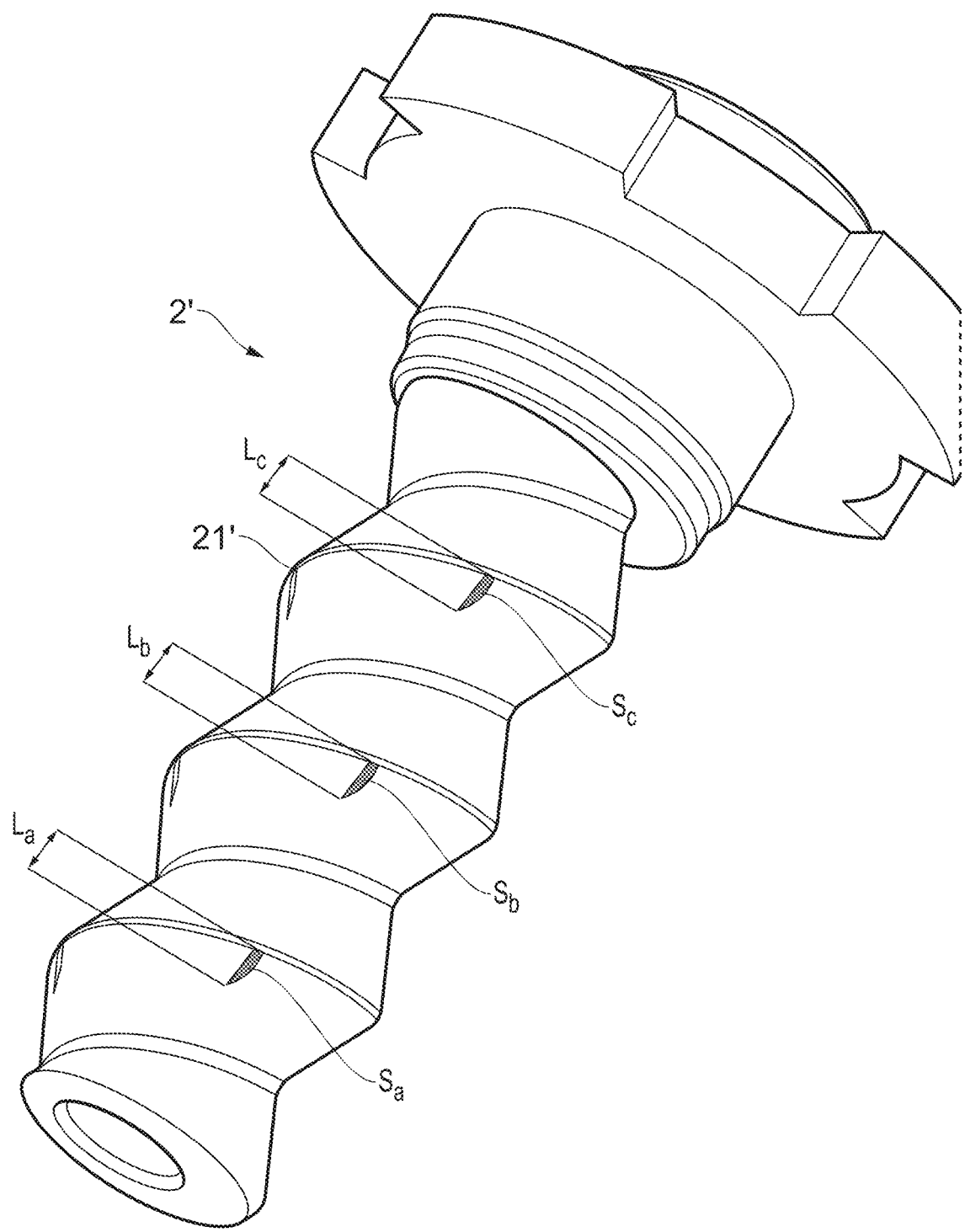
Figure 7:
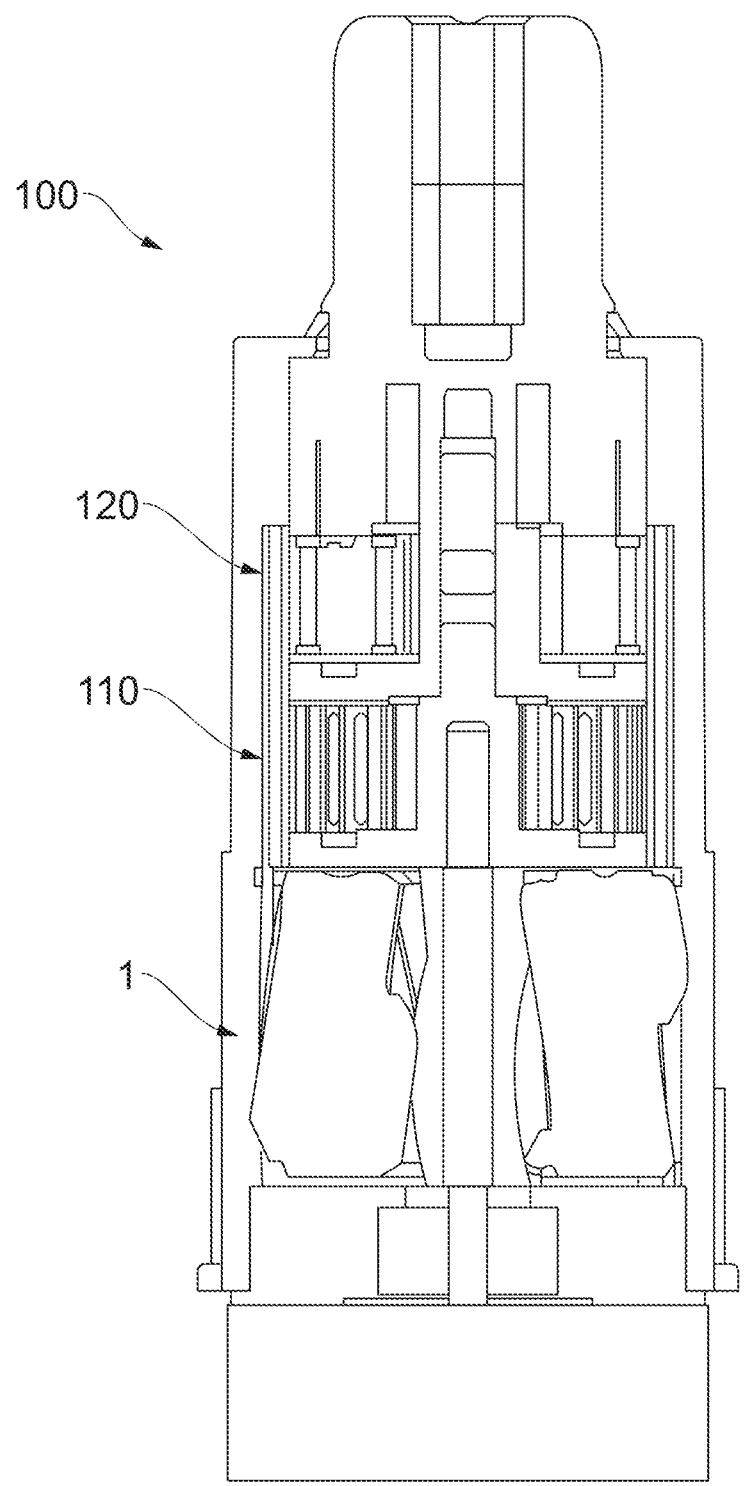
Figure 8:
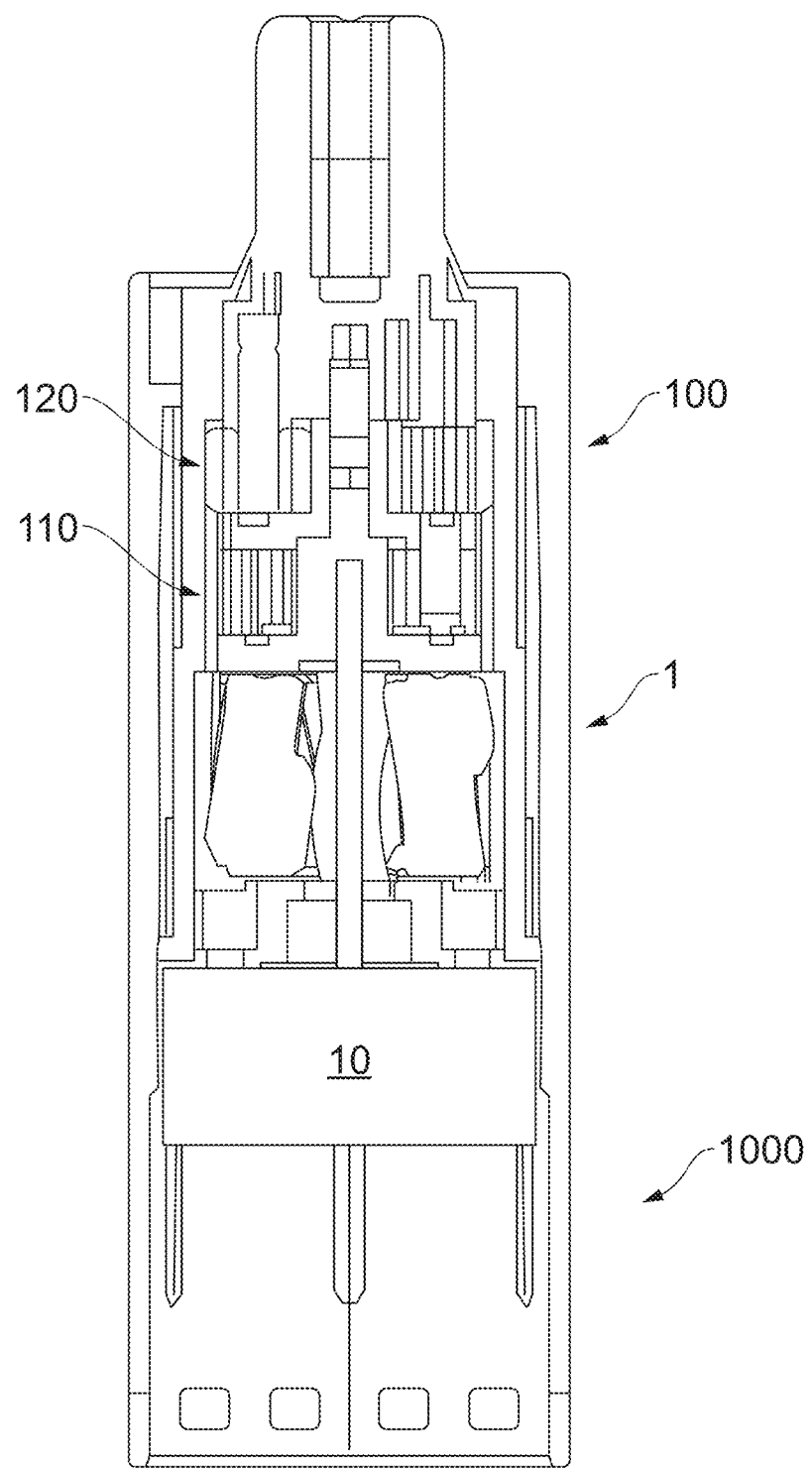

FIG. 1 illustrates a gear train according to the disclosure.
FIG. 2 illustrates an exploded view of the gear train in FIG. 1.
FIG. 3 illustrates a cross-sectional view of the gear train in FIGS. 1 and 2, showing the contact forces between the teeth of the pinion and one of the planet gears.
FIG. 4 illustrates one of the planet gears in the gear train in FIGS. 1 to 3, indicating the helix angle.
FIG. 5 illustrates the pinion with a view of the contact surface between the tooth of the pinion and a tooth of one of the planet gears when in use.
FIG. 6 illustrates a pinion from a similar gear train, but with a greater helix angle than that of the pinion in FIG. 5, with a view of the contact surfaces between the tooth of the pinion and each of the three teeth of a planet gear.
FIG. 7 illustrates a drive assembly.
FIG. 8 illustrates a tubular motor assembly comprising the drive assembly in FIG. 7.

DETAILED DESCRIPTION OF THE DISCLOSURE

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order wherein the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The disclosure aims to mitigate the problems observed when using motor assemblies with epicyclic gear trains in applications wherein reversibility is not desirable (driving the gearbox input by the output rotation is not desirable). The disclosure also aims to improve the efficiency of the epicyclic gear train while minimizing the impact on its noise and wear characteristics.

The disclosure relates to a self-locking epicyclic gear train comprising: a pinion with at least one helical gear tooth; a ring gear with a plurality of helical gear teeth; and one or more planet gears between the pinion and the ring gear, each planet gear comprising a plurality of helical gear teeth that engage the gear teeth of the pinion and of the ring gear. The helix angle of the helical gear teeth may be less than 20°. In some examples, the tooth or each tooth of the pinion is always in contact with at least one tooth of each planet gear.

The disclosure also relates to a self-locking epicyclic gear train comprising: a pinion with at least one helical gear tooth; a ring gear with a plurality of helical gear teeth; and one or more planet gears between the pinion and the ring gear, each planet gear comprising a plurality of helical gear teeth that engage the teeth of the ring gear and of the pinion; wherein the helical gear teeth have a helix angle of less than 20° and the pinion is always in contact with at least one tooth of each planet gear.

The inventors found that by minimizing the helix angle while keeping at least one of the teeth of each planet gear in contact with the pinion, the efficiency of the self-locking epicyclic gear train can be improved while minimizing the impact on its noise and wear characteristics.

In particular, it was surprising to find that this reduction in the helix angle, which increases the efficiency of the gear train, does not significantly reduce the contact surface despite the reduction in the number of teeth in contact.

The helix angle of the helical gear teeth may be less than or equal to 18°, for example less than or equal to 15°. The helix angle of the helical gear teeth may be at least 8°, for example at least 10°. The helix angle of the helical gear teeth may be between 8° and 18°, for example between 9° and 15°. The helix angle of the helical gear teeth may be between 10° and 12°, for example approximately 11°.

More specifically, the helix angle of the helical gear teeth may be between 10° and 12°.

The pinion and/or ring gear may comprise or be molded from metal. The planet gear(s) may comprise or be molded from a polymer.

The tooth or teeth of the pinion and/or the teeth of the planet gear(s) may be configured such that the coefficient of friction between them is at least 0.10, for example at least 0.11.

More specifically, the coefficient of friction between each tooth of the pinion and each tooth of the planet gear(s) may be at least 0.11.

A coefficient of friction of at least 0.11 is preferable to ensure the self-locking function.

The tooth or teeth of the pinion and/or the teeth of the planet gear(s) may be configured such that the coefficient of friction between them is comprised between 0.08 and 0.14, preferably between 0.10 and 0.12, for example between 0.11 and 0.12 or around 0.11.

The teeth of the planet gear(s) and/or of the ring gear may also be configured such that the coefficient of friction between them is comprised between 0.08 and 0.14, preferably between 0.10 and 0.12, for example around 0.11.

The axial contact surface length between each tooth of the pinion and each tooth of each planet gear may be at least 20%, for example at least 30%, 35% or 40%, of the value of the diameter of the pinion head. The axial contact surface length between each tooth of the pinion and each tooth of each planet gear may be between 35% and 50%, for example between 40% and 45%, of the value of the diameter of the pinion head. In some examples, the axial contact surface length between each tooth of the pinion and each tooth of each planet gear is approximately 43% of the value of the pinion head diameter.

More specifically, the axial contact surface length between each tooth of the pinion and each tooth of each planet gear may be at least 35% of the value of the diameter of the pinion head.

The area of the contact surface between each tooth of the pinion and each tooth of each planet gear may be at least 0.15 times, for example at least 0.2 times, the axial contact surface length L. The area of the contact surface between each tooth of the pinion and each tooth of each planet gear may be comprised between 0.2 and 0.3 times, for example between 0.20 and 0.25 times, the axial contact surface length L, for example approximately 0.23 times the axial contact surface length L.

More specifically, the area of the contact surface between each tooth of the pinion and each tooth of each planet gear may be comprised between 0.2 and 0.3 times the axial contact surface length L.

In some examples, a maximum of two teeth of each planet gear are in contact with each tooth of the pinion at any one time.

The teeth can be contoured such that, in service, rotating the pinion induces corresponding rotation of the planet gear(s), while rotating the planet gear(s) induces a force that is insufficient to induce corresponding rotation of the pinion.

Thus, the disclosure provides an epicyclic gear train with gear contours that ensure a self-locking function when the output of the gearbox is driving. This self-locking function is therefore particularly useful in applications wherein the output of the gearbox can be driving. This may be the case when the gear train is coupled to a brushless motor, for example.

This also enables high reduction ratios to be achieved.

In service, rotating the pinion can induce an effective force extending away from the center of each planet gear, to induce corresponding rotation of the planet gear(s). Rotating the planet gear(s) can induce an effective force traveling in the vicinity of the center of the pinion, so as not to induce corresponding rotation of the pinion.

In some examples, the teeth are contoured such that, in service, rotating the pinion induces an effective force extending away from the center of each planet gear, to induce corresponding rotation of the planet gear(s), while rotating the planet gear(s) induces an effective force traveling in the vicinity of the center of the pinion that is insufficient to induce corresponding rotation of the pinion, so as not to induce corresponding rotation of the pinion.

The teeth may be contoured such that the pressure angle common to each planet gear and to the pinion is such that, in service, rotating the pinion induces corresponding rotation of the planet gear(s), while rotating the planet gear(s) induces a force that is insufficient to induce corresponding rotation of the pinion.

The pinion may comprise three or fewer teeth. The pinion may comprise two or fewer teeth.

The pinion may comprise a single tooth.

The pressure angle, in particular the transverse pressure angle, common to each planet gear and to the pinion may be comprised between 30° and 60°, for example approximately 35°. The pressure angle, in particular the transverse pressure angle, common to each planet gear and to the pinion may be comprised between 35° and 55°. The pressure angle, in particular the transverse pressure angle, common to each planet gear and to the pinion may be comprised between 35° and 45°. The pressure angle, in particular the transverse pressure angle, common to each planet gear and to the pinion is preferably comprised between 35° and 40°, for example approximately 39°.

More specifically, the transverse pressure angle common to each planet gear and to the pinion may be comprised between 35° and 55°.

The planet gear(s) may comprise at least three planet gears.

The planet gear(s) may comprise four planet gears. The planet gear(s) may comprise a plurality of planet gears. The plurality of planet gears may comprise at least three planet gears, for example four planet gears.

The ring gear may comprise at least one spline, for example to mesh with a tubular housing within which the self-locking epicyclic gear train is to be seated.

The disclosure also relates to a drive assembly comprising a motor coupled to the pinion of a self-locking epicyclic gear train as described above.

The motor may comprise a brushless motor.

The drive assembly may comprise a first stage formed by the self-locking epicyclic gear train. The drive assembly may comprise a second epicyclic gear train stage. The drive assembly may comprise one or more additional epicyclic gear train stages. The second stage or the additional stages of the epicyclic gear train may not be self-locking.

The disclosure also relates to a tubular motor assembly comprising a drive assembly as described above.

For the avoidance of doubt, all the features described herein also apply to any aspect of the disclosure.

Different aspects of different embodiments of the disclosure are described in more detail below, in reference to FIGS. 1 to 8 appended hereto.

FIGS. 1 to 3 illustrate an overall view of a self-locking epicyclic gear train 1 according to the disclosure. This gear train comprises a pinion 2 with a helical gear tooth 21, a ring gear 3 with a plurality of helical gear teeth 31 and four planet gears 4 between the pinion and the ring gear. Each planet gear 4 comprises a plurality of helical gear teeth 41 that engage the teeth 21, 31 of the ring gear 3 and of the pinion 2.

The gear train is mounted on a carriage 11, which comprises an axle 12 on which the pinion 2 is mounted and a respective axle 14 for each planet gear 4. The person skilled in the art will understand that the pinion 2 will comprise a coupling device (not shown) for coupling to a motor when in use. The carriage 11 also comprises an output gear 16. The ring gear 3 comprises four splines 5 to mesh with a tubular housing within which the self-locking epicyclic gear train is to be seated.

FIG. 3 schematically illustrates the application of an effective contact force F1/2 from the pinion 2 to a planet gear 4, and a counterforce F2/1 from the planet gear 4 to the pinion 2. In this example, the pinion 2 and the ring gear 3 are molded from a metal, and the planet gears 4 are molded from a polymer. The coefficient of friction, in service, between the gear teeth 21, 41 of the pinion 2 and of the planet gears 4 is approximately 0.11. The transverse pressure angle common to each planet gear 4 and to the pinion 2 is approximately 39°.

As shown, rotating the pinion 2 in service induces an effective force F1/2 extending to a distance rb2 from the center of each planet gear 4, to induce corresponding rotation of the planet gears 4. Conversely, rotating the planet gears 4 induces an effective force F2/1 traveling in the vicinity of the center of the pinion 2, to a distance rb1 so as not to induce corresponding rotation of the pinion 2.

The gear teeth of the self-locking epicyclic gear train 1 are thus contoured such that, in service, rotating the pinion induces corresponding rotation of the planet gears, while rotating the planet gears induces a force that is insufficient to induce corresponding rotation of the pinion.

Thus, the disclosure provides an epicyclic gear train with gear contours that ensure a self-locking function. This makes it possible to achieve high reduction ratios and to prevent the motor from being driven when the output is driving, which can be useful in certain applications, for example when the gear train is coupled to a brushless motor with low or no cogging (resistive magnetic torque).

According to the disclosure and as shown in FIG. 4, the helical gear teeth 41 (21, 31, 41) have a helix angle β, which is 11° in this example. With a helix angle β, it possible to obtain a contact ratio slightly above one, which means that the pinion 2 is always in contact with at least one tooth 41, but at most two teeth 41, of each planet gear 4.

FIG. 5 shows the pinion 2, highlighting the contact surface S between pinion 2 and one of the planet gears 4.

The contact surface S has an axial length L that extends over a large part of the width of one side of tooth 21. The contact surface S also has a surface area corresponding to the highlighted region. In this example of the disclosure, the diameter of the pinion head 2 is 7.5 mm, the axial length L is approximately 3.2 mm and the contact surface area S is approximately 0.74 mm. The base gear efficiency (fixed planet gear carrier) of this arrangement is approximately 62%.

FIG. 6 shows a pinion 2' for an epicyclic gear train (not shown) wherein the helix angle of the helical gear teeth is 30°, highlighting each of the three contact surfaces Sa, Sb, Sc between the pinion 2' and one of the planet gears. Each contact surface Sa, Sb, Sc has an axial length La, Lb, Lc that extends over part of the width of one side of tooth 21'. The contact surfaces Sa, Sb, Sc provide an aggregate area corresponding to the sum of the highlighted regions shown.

In this example, the diameter of the pinion head 2 is 7.5 mm, the aggregate surface area axial length (La+Lb+Lc) is approximately 3.6 mm and the aggregate contact surface area (Sa+Sb+Sc) is approximately 0.75 mm. The base gear efficiency (fixed planet gear carrier) of this arrangement is approximately 57%.

It is generally desirable to provide helical gear teeth with a larger helix angle, as this should enable the contact surface to be larger and more spread out, thus reducing wear and noise in the gear train 1. Increasing the helix angle is also known to have a negative effect on the efficiency of the gear train, since it increases the axial component of the force transferred between the gear teeth.

However, it was surprising to find that a helix angle β of 11° used with a self-locking gear contour, as described herein, actually provides a contact surface S (see FIG. 5) comparable to an aggregate contact surface Sa, Sb, Sc (see FIG. 6) with a similar arrangement having a helix angle of 30° which results in a contact ratio of three.

The person skilled in the art will be aware that this reduction in the helix angle β has a considerable impact on the efficiency of the gear train 1. As such, it was determined that the efficiency of the gear train 1 can be significantly improved without substantially impairing the wear and noise of the gear train 1. Although the distribution of the contact surface S is less spread out in the gear train 1 according to the disclosure, this seems to have a relatively minor impact on its wear and noise in many applications.

The axial length L of the contact surface S between the tooth 21 of the pinion 2 and the tooth 41 of each planet gear 4 is approximately 43% of the value of the diameter of the pinion head 2. It was found that this length could be less, for example up to 20%, but preferably greater than 35% and ideally greater than 40%.

Moreover, the area of the contact surface S between the tooth 21 of the pinion 2 and the tooth 41 of each planet gear 4 is approximately 0.23 times the axial length L of the contact surface S. It was found that this length could be less, for example up to 0.15 times, but preferably greater than 0.2 times the axial contact surface length L.

As illustrated in FIG. 7, the disclosure further relates to a drive assembly 100 comprising a motor 10 coupled to the pinion 2 of the self-locking epicyclic train 1 described above. In this example, the motor 10 comprises a brushless motor. The drive assembly 100 comprises a first stage formed by the self-locking epicyclic gear train 1 and two additional epicyclic gear train stages 110, 120. In this example, the additional stages 110, 120 are not self-locking.

As illustrated in FIG. 8, the disclosure also relates to a tubular motor assembly 1000 comprising a drive assembly 100 described above.

Although the present disclosure is described in conjunction with the examples of embodiments outlined above, various alternatives, modifications, variations, improvements, and/or substantial equivalents that are known or current or to be anticipated before long may be obvious to those of at least ordinary skill in the art. In addition, the technical effects and/or technical problems described in the present disclosure are illustrative rather than restrictive. Therefore, the disclosed description in the present disclosure may be used to solve other technical problems and have other technical effects and/or may solve other technical problems. Accordingly, the examples of the embodiments of the present disclosure as set forth above are intended to be illustrative rather than limiting. Various changes can be made without departing from the spirit or scope of the present disclosure. Therefore, the present disclosure is intended to include all known or earlier developed alternatives, modifications, variations, improvements and/or basic equivalents.

LIST OF REFERENCE NUMBERS

1 self-locking epicyclic gear train
10 motor
11 carriage
12 pinion axle
14 planet gear axle
16 output gear
100 drive assembly
110 additional epicyclic gear train stage
120 additional epicyclic gear train stage
1000 tubular motor
2 pinion
20 rotational axis of the pinion
21 pinion tooth
3 ring gear
31 ring gear tooth
4 planet gear
41 planet gear wheel
5 spline
L axial contact surface length
$L_a$ axial contact surface length
$L_b$ axial contact surface length
$L_c$ axial contact surface length
S contact surface
$S_a$ contact surface
$S_b$ contact surface
$S_c$ contact surface

What is claimed is:

1. A self-locking epicyclic gear train comprising:
a pinion with at least one helical gear tooth;
a ring gear with a plurality of gear teeth; and
one or more planet gears between the pinion and the ring gear, each planet gear comprising a plurality of helical gear teeth that engage the teeth of the ring gear and of the pinion;
wherein the helical gear teeth have a helix angle of less than 20° and the pinion is always in contact with at least one tooth of each planet gear.

2. The self-locking epicyclic gear train according to claim 1, wherein the helix angle of the helical gear teeth is between 10° and 12°.

3. The self-locking epicyclic gear train according to claim 1, wherein a coefficient of friction between each tooth of the pinion and each tooth of the planet gear(s) is at least 0.11.

4. The self-locking epicyclic gear train according to claim 1, wherein an axial length (L) of a contact surface(S) between each tooth of the pinion and each tooth of each planet gear is at least 35% of the value of a diameter of the pinion.

5. The self-locking epicyclic gear train according to claim 4, wherein an area of the contact surface(S) between each tooth of the pinion and each tooth of each planet gear is between 0.2 and 0.3 times the axial length L of the contact surface(S).

6. The self-locking epicyclic gear train according to claim 1, wherein at most two teeth of each planet gear are in contact with each tooth of the pinion at any one time.

7. The self-locking epicyclic gear train according to claim 1, wherein the teeth are contoured such that, in service, rotating the pinion induces a corresponding rotation of the planet gear(s), while rotating the planet gear(s) induces a force that is insufficient to induce a corresponding rotation of the pinion.

8. The self-locking epicyclic gear train according to claim 7, wherein the teeth are contoured such that, in service, rotating the pinion induces an effective force (F1/2) extending away from a center of each planet gear, to induce a corresponding rotation of the planet gear(s), while rotating the planet gears(s) induces an effective force (F2/1) traveling in a vicinity of a center of the pinion, that is insufficient to induce a corresponding rotation of the pinion 3 so as not to induce a corresponding rotation of the pinion.

9. The self-locking epicyclic gear train according to claim 1, wherein the pinion comprises a single tooth.

10. The self-locking epicyclic gear train according to claim 1, wherein a transverse pressure angle common to each planet gear and to the pinion is comprised between 35° and 55°.

11. The self-locking epicyclic gear train according to claim 1, wherein the planet gear(s) comprise(s) at least three planet gears.

12. A drive assembly comprising a motor coupled to the pinion of the self-locking epicyclic gear train according to claim 1.

13. The drive assembly according to claim 12, wherein the motor comprises a brushless motor.

14. A tubular motor assembly comprising the drive assembly according to claim 12.

* * * * *